(No Model.)

B. F. DAY.
SAW.

No. 416,094. Patented Nov. 26, 1889.

WITNESSES:
F. Norman Dixon.
Lewis Altmaier.

Benjamin F. Day
INVENTOR
By his attorneys,
Wm C Strawbridge
J Bonsall Taylor.

UNITED STATES PATENT OFFICE.

BENJAMIN F. DAY, OF PHILADELPHIA, PENNSYLVANIA, ASSIGNOR TO WILLIAM ATKINSON, OF SAME PLACE.

SAW.

SPECIFICATION forming part of Letters Patent No. 416,094, dated November 26, 1889.

Application filed May 21, 1889. Serial No. 311,634. (No model.)

*To all whom it may concern:*

Be it known that I, BENJAMIN F. DAY, a citizen of the United States, residing in the city and county of Philadelphia, in the State of Pennsylvania, have invented certain Improvements in Saws, of which the following is a specification.

My invention relates to a class of saws the plates of which embody marginal recesses of a given outline, adapted to receive and hold separate insertible teeth, the bodies or shanks of which correspond in outline to said recesses, and which, therefore, when the teeth become so worn down as to be no longer useful, admit of their being removed and replaced.

As at present constructed, considerable portions of the insertible teeth of saws of the foregoing character are when their projecting cutting portions become worn down, wasted, because no provision is made for the setting out of said teeth to permit of their being reground for further use.

It is the object of my invention to provide for the re-adjustment or re-projection of worn down insertible saw teeth, by providing for the insertion behind the re-projected and re-sharpened worn teeth of filling pieces or equivalent supporting devices.

In the accompanying drawings, I have represented a portion of a circular saw embodying my improvements, but it is of course to be understood that these improvements are applicable to and may be embodied in other than circular saws.

Figure 1:
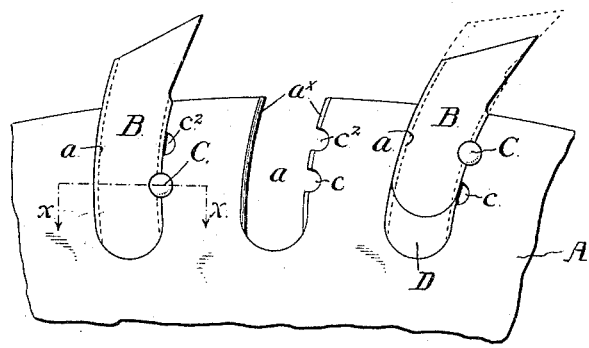
Figure 2:
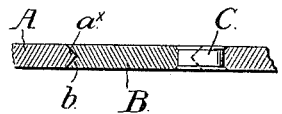
Figure 3:
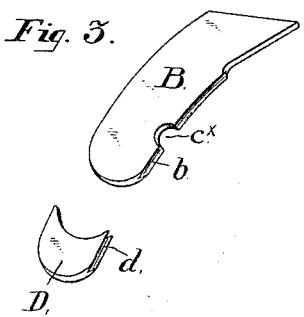

In the drawings, Figure 1 is a side elevational view of a part of the peripheral portion of the plate of a circular saw embodying insertible teeth applied in accordance with my invention. Fig. 2 is a magnified, transverse, sectional, edge view through a portion of the saw represented in Fig. 1, the section being supposed in the plane of the dotted line $x\ x$ of said figure, and sight being taken in the direction of the arrows upon said line. Fig. 3 is a perspective view of an insertible saw tooth, and of such a filling block as I employ in connection therewith.

Similar letters of reference indicate corresponding parts.

In the drawings, A represents the saw plate proper, and $a$ the saw tooth recesses in the edge of said plate. The recesses $a$ represented are formed with tongues $a^x$ traversing their longitudinal edges.

B represent insertible teeth, the longitudinal edges of which are provided with grooves $b$, adapted to the tongues of the recesses.

C are rivets adapted when the teeth, which are so respectively conformed to their respective recesses as to completely fill them, are in place to secure said teeth by being entered through rivet seats formed partly in said teeth and partly in the plate.

In the drawings, that portion of the rivet seat which is formed in the tooth is designated $c^x$, while the portion which is formed in the saw plate is designated $c$. The rivet seats are preferably countersunk from both sides, so that when the rivet is entered its heads can be forced to lie within the planes of the side faces of the plate and tooth.

All of the foregoing elements in their above described relationship are usual in saws possessing insertible teeth.

As already stated, the insertible teeth as originally applied to the plate conform both lengthwise and sidewise to and fill the recesses for them, a sufficient portion of them projecting beyond the edges of the plate to form their cutting portions. When this projecting cutting portion has been worn down to an insufficient projection from out its recess,—I provide for its further outward projection by forming in the wall of the recess beyond the rivet seat $c$, another or supplemental rivet seat $c^2$, which, as in the case of the rivet seat $c$, is adapted when the tooth is sufficiently projected, to register or match with the rivet seat $c^x$ in the tooth, and with it form a circular opening partly in the saw plate and partly in the tooth through which the rivet can be inserted and secured, with the result that the tooth will be permanently secured in its projected position. In conjunction with its rivet which, as applied to the supplemental seat, effectually secures the tooth in its projected position, I provide a filling block or piece D, the edges of which are, in the construction shown, formed with grooves $d$, conformed to the lateral tongues $a^x$ of the recess, and which as an entirety is conformed to the basal portions of both the recess and the insertible tooth, and is of such length as to completely fill in between the respective bases of the tooth and recess, so as to, in effect, so to speak, complete the prolongation of the tooth, or restore it to its original length and enable it to resist the radial or other inward thrust of the tooth under its contact with the material being operated upon.

As is apparent, a series of supplemental rivet seats and notches, each adapted to register with the seat in the tooth, may be formed in the plate, and a series of filling blocks of varying lengths and correspondent to the openings between the bases of the teeth and recesses when the tooth is secured with respect to the various notches, may be employed.

The invention is applicable of course in connection with insertible saw teeth, the edges of which are not engaged by tongue and groove connections, and which are not secured by rivets.

Having thus described my invention, I claim and desire to secure by Letters Patent:—

In combination with a saw plate provided with peripheral recesses the margins of which embody both tongues and rivet notches,—teeth each embodying a corresponding rivet notch and lateral tongue grooves and having shanks which are conformed to the plate recesses and fitted partly down within said recesses,—rivets adapted to the aforesaid rivet notches and serving to retain the teeth,—and filling blocks embodying lateral tongue grooves and fitted within and against the tongued sides and the bottoms of the recesses below the teeth, to the end that the teeth may be supported on both sides by the solid metal of the plate and below by that of the filling blocks,—substantially as set forth.

In testimony that I claim the foregoing as my invention I have hereunto signed my name this 8th day of May, A. D. 1889.

BENJAMIN F. DAY.

In presence of—
J. BONSALL TAYLOR,
WM. C. STRAWBRIDGE.